Sept. 22, 1959     D. F. KAMPE     2,905,255
SOIL WORKING IMPLEMENT MOUNTING
Filed Feb. 13, 1956     4 Sheets-Sheet 1

D. KAMPE
INVENTOR
BY E. C. McRae
J. R. Faulkner
P. J. Hilder
ATTORNEYS

Sept. 22, 1959 D. F. KAMPE 2,905,255
SOIL WORKING IMPLEMENT MOUNTING
Filed Feb. 13, 1956 4 Sheets-Sheet 2

D. KAMPE
INVENTOR.
BY E. C. McRae
J. R. Faulkner
P. J. Hilder
ATTORNEYS

Sept. 22, 1959   D. F. KAMPE   2,905,255
SOIL WORKING IMPLEMENT MOUNTING
Filed Feb. 13, 1956   4 Sheets-Sheet 4

D. KAMPE
INVENTOR.
BY
ATTORNEYS

United States Patent Office 2,905,255
Patented Sept. 22, 1959

2,905,255

SOIL WORKING IMPLEMENT MOUNTING

Dwight F. Kampe, Birmingham, Mich., assignor to Ford Motor Company, Dearborn, Mich., a corporation of Delaware Application February 13, 1956, Serial No. 564,912

11 Claims. (Cl. 172—441)

This invention relates to earth-engaging implements, and more particularly to such implements which are adapted to be mounted on liftable trailing hitch links of a tractor.

Modern tractors often are provided with a pair of transversely spaced, power liftable, trailing hitch links and usually also a centrally located top link for receiving various earth working implements. One or more earth-engaging elements of the implement are mounted on a main implement frame which is attached to a vertical triangular frame (termed an A frame) pivotally connected with the tractor links, such that, by raising or lowering the links, the implement may be raised out of engagement with, or lowered into engagement with, the ground behind the tractor. Inasmuch as a tractor is normally operated over more or less uneven ground, and ridges and through depressions, some difficulty is encountered in maintaining even and uniform operation of soil-engaging and working implements, particularly those implements having a number of earth-engaging elements, and extending a substantial distance laterally or to the rear of the tractor.

The present invention, which is shown applied to the frame of a disc harrow, comprises a linkage between the A frame which receive the tractor links and the main frame of the implement on which the earth-engaging elements are carried. Such linkage provides a flexible mounting of the implement which, while still permitting the implement to be raised into inoperative position, permits a very substantial vertical, rocking, and pitching motion of the tractor relative to the implement without disturbing the engagement of the implement with the ground. The mount also permits the implement itself to ride over rocks and other obstructions on the ground without injury to the implement and without substantial displacement of the hitch links of the tractor.

Among the objects of the present invention are to provide an improved mounting for a generally rigid implement frame for supporting earth-engaging implements from a tractor having a pair of transversely spaced, power liftable, trailing hitch links, whereby the frame may rock or tilt as required to ride over obstacles or to conform with the contour of the land; to provide such a mounting in which vertical or rocking motion of the tractor is not transmitted to the implement frame; to provide such a mounting in which tractor traction and draft is maintained more uniform; and generally to improve earth-engaging implements of the type described.

Other objects and the nature and scope of the invention will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

Figure 1:
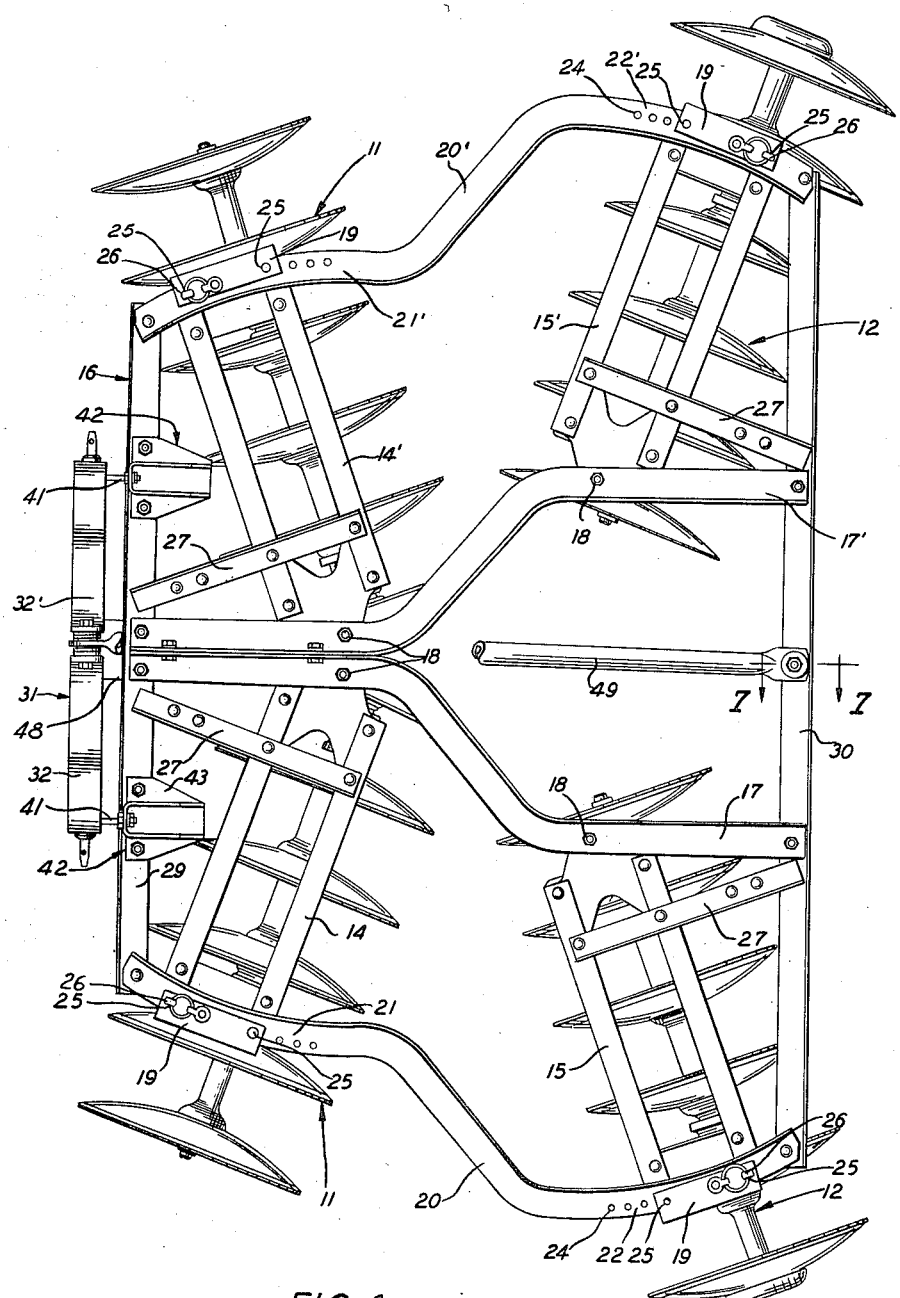
Figure 1 is a top plan view of a harrow constructed according to the present invention, a portion of the harrow being broken away to show details of construction.
Figure 2:
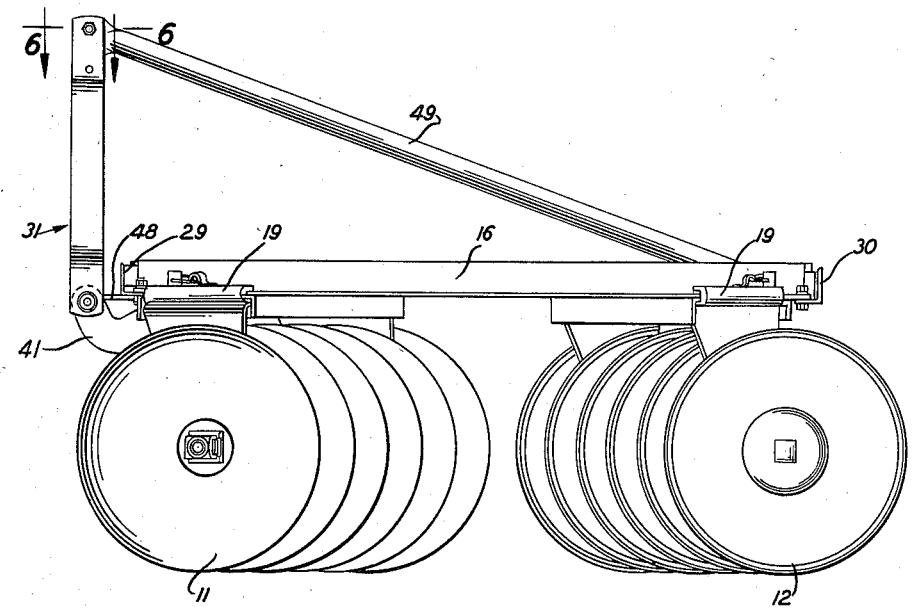
Figure 2 is a side elevation of the harrow of Figure 1.

Referring now to the drawings, the harrow of the present invention comprises a pair of front disc gangs 11, 11, and a pair of rear disc gangs 12, 12, each disc gang being formed of a plurality of dished or hollowed discs axially mounted in spaced relation along a rod extending generally transversely of the harrow. The disc gangs 11, 11 are mounted for rotation on the lower portions of a pair of front gang frames 14 and 14′, the gang frames being similar but of opposite hand. Similarly, the rear disc gangs 12, 12 are mounted for rotation on a pair of rear gang frames 15 and 15′ which are similar but of opposite hand. The construction of the gangs and their mountings on the gang frames is more or less conventional and does not form a part of the present invention.

The disc gangs 11, 11 and 12, 12 are mounted to project downwardly from a harrow main frame 16, the harrow frame preferably being formed of angle iron, lying generally in a horizontal plane, and having the general outline indicated in Figure 1. The inner ends of the front gang frames 14 and 14′ each are pivotally mounted on the central frame members 17 and 17′ respectively, of the main frame 16 by a bolt 18 for swinging in a horizontal plane to adjust the operating angle of the front gangs 11, 11. Similarly, the rear gang frames 15 and 15′ are pivotally mounted at their inner ends on the central frame members 17 and 17′, respectively, by bolts 18, 18 for adjustment of the operating angle of the rear gangs. Preferably, the inner ends of the front gangs are adjacent each other, and the inner ends of the rear gangs are somewhat wider spaced as in conventional tandem disc harrows, the concave sides of the discs of the front gangs 11, 11 facing outwardly and the similar sides of the rear disc gangs 12, 12 facing inwardly.

While the inner ends of the gang frames 14 and 14′, and 15 and 15′ are pivotally mounted on the underside of the main frame 16, the outer ends of the gang frames are free to move along the frame 16 and are provided with portions 19 overlying the horizontal flanges of side members 20 and 20′ of the main frame. Preferably, the side members 20 and 20′ are provided with arcuate sections 21, 22 and 21′, 22′, respectively, which have a radius corresponding to the length of the gang frames from the pivot bolts 18. One or more holes 24 are provided in these arcuate sections of the side members 20 and 20′ which are registered selectively with one or more holes 25 provided in the outer ends of the gang frames 14, 14′, 15 and 15′. Captive pins 26 are used in holes 24 and 25 for holding the gang frames in any adjusted position.

Preferably, the gang frames 14, 14', 15 and 15' each are provided adjacent its inner end with a brace member 27 secured to the top of the frame, extending in a generally fore-and-aft direction, and having a bifurcated outer end receiving the horizontal flange of the front or rear cross member 29 or 30, respectively, of the main frame 16. The brace members 27 reinforce the pivoted ends of the gang frames against twisting during operation of the harrow.

Figure 5:
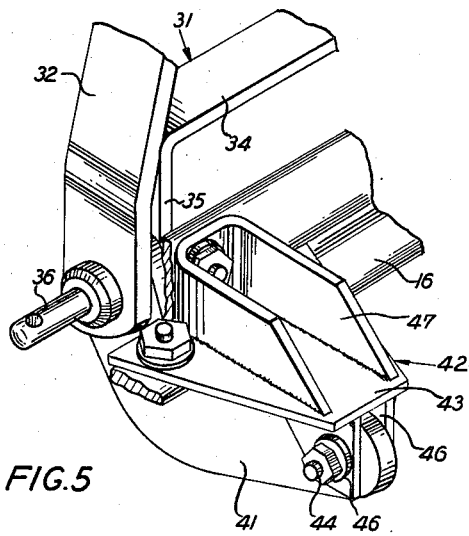
Figure 5 is an enlarged, fragmentary, isometric view showing the attachment of the main frame of the harrow to the A frame.
Figure 7:
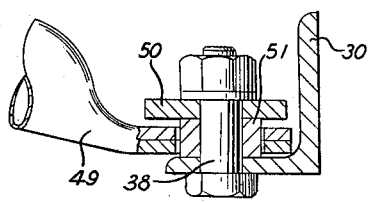
Figure 7 is a vertical section showing the attachment of the top strut to the main frame of the harrow, taken generally on the line 7—7 of Figure 1.
Figure 3:
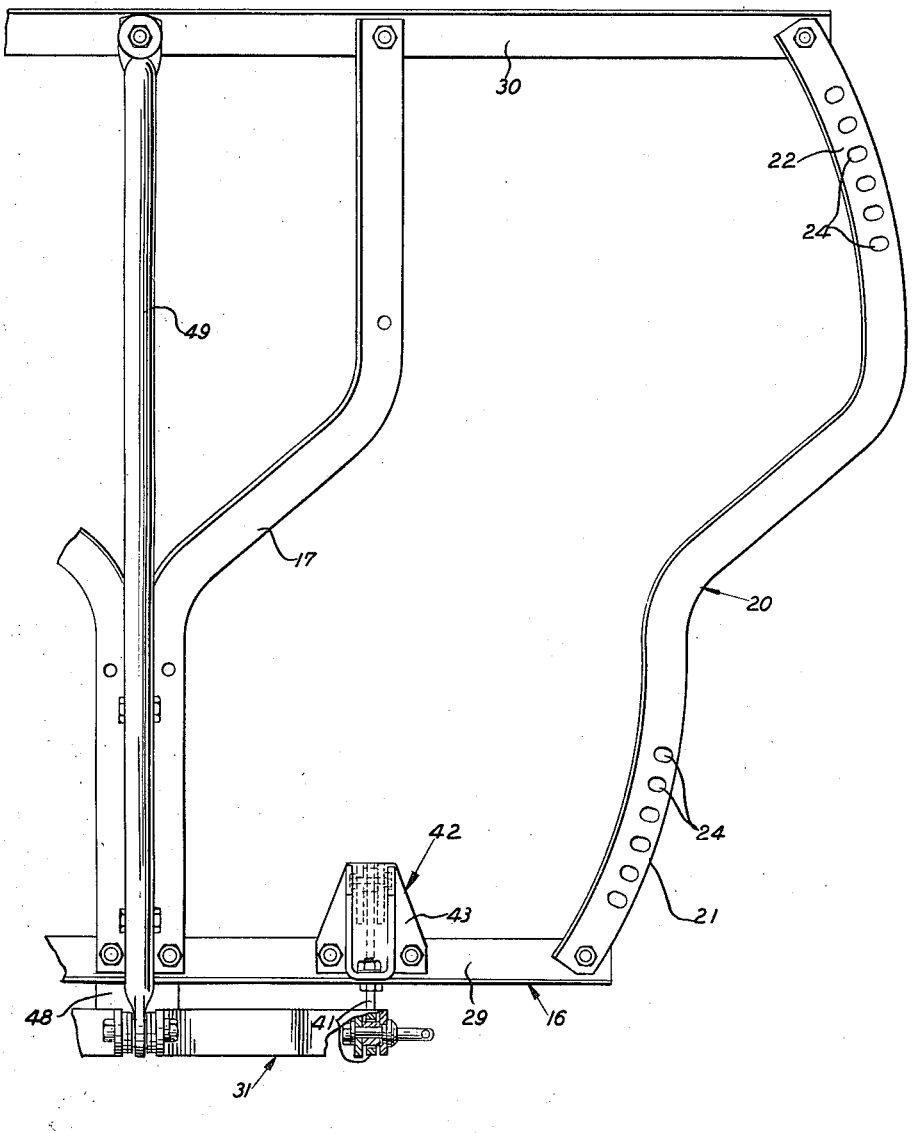
Figure 3 is an enlarged plan view of a portion of the harrow, the gang frames and gangs being omitted.
Figure 4:
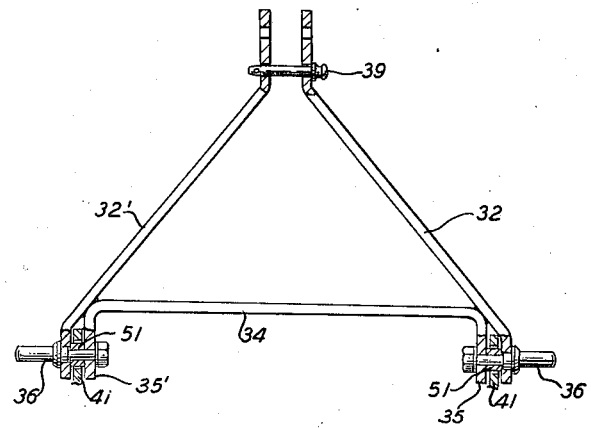
Figure 4 is a front elevation of the A frame of the harrow, the links for connecting the A frame to the main frame of the harrow being shown in section.
Figure 8:
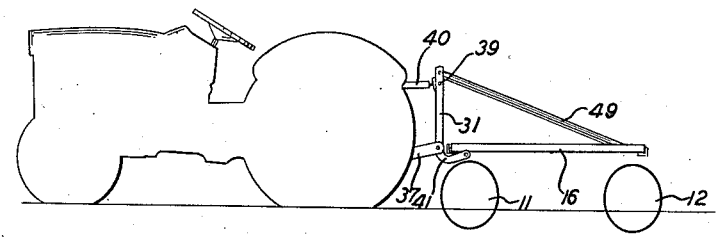
Figure 8 is a diagrammatic view of the harrow of the present invention attached to a tractor and operated on level ground.

The main frame of the harrow is supported from a generally vertically extending triangular frame 31 (usually termed an A frame) by a linkage to be described. The A frame 31, which may be fabricated of metal strip, has a pair of upwardly converging side members 32 and 32' and a tranverse lower member 34 secured to the lower portions of the side members as by welding and having terminal portions 35 and 35' extending downwardly in spaced relation to the lower ends of the side members (Figures 4 and 5). A pair of aligned, transverse pins 36, 36 extend outwardly from the lower corners of the A frame and provide connections for the lower hitch links (one link 37 shown) of the tractor. Preferably, the pins 36, 36 extend across the space between the lower ends of the side members 32 and 32' and the terminal portions 35 and 35' of the lower member 34.

The A frame side members 32 and 32' converge several inches below the top of the A frame 31 and then extend upwardly in spaced, parallel relation, the converged portion of these members detachably receiving a transversely extending pin 39 for pivotally receiving the rear end of the top link 40 of the tractor between the side members.

The forward portion of the main frame 16 is supported from the lower corners of the A frame 31 by a pair of fore-and-aft extending links 41, 41 which may be generally L-shaped in outline and are pivotally connected to the A frame and to the main frame for vertical swinging movement about a transverse pivot and also a limited amount of universal movement. Preferably, the forward ends of the links 41, 41 are received by the pins 36, 36 within the space between the lower ends of the side members 32, 32 and the terminal portions 35 and 35' of the lower member 34.

The rear ends of the links 41, 41 connecting the A frame and main frame of the harrow are pivotally connected to the forward portion of the main frame, preferably by mounts 42, 42 extending rearwardly from the horizontal flange of the front cross member 29 of the harrow frame. The rearwardly extending portion of each link 41 extends beneath the front cross member 29 and is free to swing in a vertical plane on, and have a limited universal movement about, a transverse pivot 44 on each mount 42. The main frame 16 of the harrow will project laterally substantially beyond the lower corners of the A frame, and the mounts 42, 42 may each consist of a plate 43 bolted to the front cross member 29 of the main frame and having a pair of downwardly extending, spaced flanges 46, 46 receiving the link pivot 44. The plate 43 may be further reinforced as indicated in the drawings by a U-shaped top flange 47 welded to the top of the plate and bolted to the cross member 29.

Figure 6:
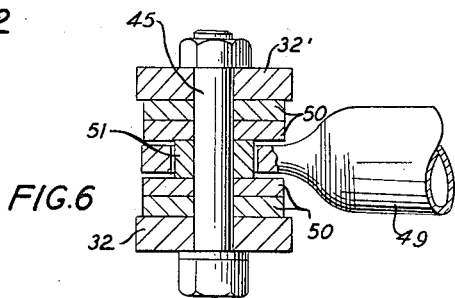
Figure 6 is a horizontal section, taken on the line 6—6 of Figure 2, showing attachment to the top strut to the A frame.

A strut 49 extends from the top portion of the A frame rearwardly downwardly to the center of the rear frame cross member 30, the strut being secured for limited universal movement about a transverse pivot 45 at the top portion of the A frame and for similar movement about a vertical pivot 46 at its rearward end. These pivots may be provided as indicated in Figures 5 and 6 respectively by use of bolts, washers 50, and spacers 51 which loosely receive the ends of the strut. The top strut 49 and the links 41, 41 provide a three-point suspension of the main frame 16 from the A frame 31, two of the points on the main frame being located adjacent the forward end thereof and the third point being located at the rear center of the main frame.

Preferably, a forward extension 48 is provided at the center of the front cross member 29 to engage the lower member 34 of the A frame 31 and limit upward movement of the front of the harrow, particularly while the harrow is in raised transport position and the tractor is being operated over rough ground having a tendency to bounce the harrow frame on its supporting linkage.

The tractor with which the harrow of the present invention is adapted to be used is of the type having a pair of transversely spaced, power liftable, trailing hitch links (one link 37 shown) and a central top link 40. In such a tractor, the hitch links may be raised in order to lift the harrow out of contact with the ground as in transporting the implement, in turning at the end of a field or in crossing a grass waterway. In the harrow, according to the present invention, raising the lower links of the tractor raises the A frame 31, the links 41, 41 pivoting downwardly somewhat on the pins 36, 36 until the underside of the front cross member 29 of the main frame rests on the top edges of the links. The strut 49 supports the rear cross member 30 of the main frame, the entire harrow being supported out of contact with the ground. Accordingly, it is not necessary to de-angle the gangs, the gangs being maintained at operating angles at all times.

In operation, the weight of the harrow alone may be relied on to produce the necessary penetration of the discs into the soil. However, if desired, the hitch links may be raised slightly to raise the A frame 31 relative to the main frame 16 in order to cause a greater upward pull on the harrow and a subsequent decrease in penetration by transferring some of the weight of the harrow to the tractor. The linkage is such that upon raising the A frame 31 by means of the tractor draft links 37—37, the harrow remains essentially level with the front and rear gangs operating at about the same depth even though a controlled variable portion of the harrow weight is transferred to the tractor. The top link 40, if adjustable in length, may be lengthened or shortened slightly to increase or decrease penetration of the rear gangs 12, 12.

While the harrow is operating, the pins 36, 36 and pivots 44, 44 are generally at the same elevation, the top edges of the links 41, 41 being well below the underside of the front cross member 29. As the tractor wheels encounter minor irregularities in the ground which cause the tractor to roll and pitch, the links 41, 41 and strut 49 permit the A frame 31 to move with the tractor without communicating rolling and pitching motion of the tractor to the main frame 16 of the hollow. Inasmuch as the links 41, 41 are not rigidly interconnected, but are free to swing independently and both the links and the strut 49 have a limited universal movement, ordinary rolling and pitching of the tractor does not effect operation of the harrow and, further, the harrow is free to be rocked and the entire harrow or a side thereof raised upwardly by obstructions which the gangs may encounter in the ground, thereby lessening strain on the harrow and breakage of discs. Further, since the harrow is free to move on the A frame, there is little or no tendency for the harrow to raise the rear of the tractor and thereby remove load from the rear wheels and cause loss of traction.

What is claimed is:

1. An earth-engaging implement for attachment to a tractor having a pair of transversely spaced, power liftable, trailing hitch links and a centrally located top link; said implement having a generally vertically extending A frame adapted to have its lower extremities pivotally connected to the rear ends of the hitch links and its upper portion pivotally connected to the rear end of the top link, a generally horizontal frame behind the A frame and mounting earth engaging elements, a pair of relatively short, independently swingable, transversely spaced lower links pivotally connecting the forward portion of the horizontal frame with the lower extremities of the A frame for vertical and rocking movement of the main frame relative to the A frame, and a relatively long top strut connecting the upper portion of the A frame with the rear, central portion of the horizontal frame.

2. A disc harrow for attachment to a tractor having a pair of transversely spaced, power liftable, trailing hitch links and a centrally located top link; said implement having a generally vertically extending A frame adapted to have its lower extremities pivotally connected to the rear ends of the hitch links and its upper portion pivotally connected to the rear end of the top link, a generally horizontal frame behind the A frame and mounting a plurality of disc-harrow gangs, a pair of relatively short, independently swingable, transversely spaced lower links pivotally connecting the forward portion of the horizontal frame with the lower extremities of the A frame for vertical and rocking movement of the main frame relative to the A frame, a relatively long top strut connecting the upper portion of the A frame with the rear portion of the horizontal frame.

3. An earth-engaging implement for attachment to a tractor having a pair of transversely spaced, power liftable, trailing hitch links and a centrally located top link; said implement having a generally vertically extending A frame adapted to have its lower extremities pivotally connected to the rear ends of the hitch links and its upper portion pivotally connected to the rear end of the top link, a generally horizontal frame behind the A frame and mounting earth engaging elements, a pair of relatively short, independently swingable, fore-and-aft extending, transversely spaced lower links pivotally connecting the forward portion of the horizontal frame with the lower extremities of the A frame for vertical and rocking movement of the main frame relative to the A frame, and a relatively long top strut connecting the upper portion of the A frame with the rear central portion of the horizontal frame.

4. An earth-engaging implement for attachment to a tractor having a pair of transversely spaced, power liftable, trailing hitch links and a centrally located top link; said implement having a generally vertically extending A frame adapted to have its lower extremities pivotally connected to the rear ends of the hitch links and its upper portion pivotally connected to the rear end of the top link, a generally horizontal frame behind the A frame and mounting earth-engaging elements, and linkage supporting the horizontal frame from the A frame, said linkage comprising a pair of relatively short, transversely spaced links pivotally connected for vertical swinging movement with the lower portion of the A frame and the front portion of the horizontal frame, and a relatively long top strut connecting the upper portion of the A frame with the rear central portion of the horizontal frame, the links connecting the A frame with the horizontal frame being constructed and arranged whereby pivotal movement of the links in a direction to drop the front portion of the horizontal frame downwardly is limited.

5. An earth-engaging implement for attachment to a tractor having a pair of transversely spaced, power liftable, trailing hitch links and a centrally located top link; said implement having a generally vertically extending A frame adapted to have its lower extremities pivotally connected to the rear ends of the hitch links and its upper portion pivotally connected to the rear end of the top link, a generally horizontal frame behind the A frame and mounting earth-engaging elements, and linkage supporting the horizontal frame from the A frame, said linkage comprising a pair of relatively short, transversely spaced lower links pivotally connected for vertical swinging movement with the lower portion of the A frame and the front portion of the horizontal frame, and a relatively long top strut pivotally connected with the upper portion of the A frame and the rear portion of the horizontal frame, the lower links connecting the A frame with the horizontal frame extending beneath the horizontal frame whereby pivotal movement of the links in a direction to drop the front portion of the horizontal frame downwardly is limited.

6. An earth-engaging implement for attachment to a tractor having a pair of transversely spaced, power liftable, trailing hitch links and a centrally located top link; said implement having a generally vertically extending A frame adapted to have its lower extremities pivotally connected to the rear ends of the hitch links and its upper portion pivotally connected to the rear end of the top link, and a generally horizontal main frame behind the A frame and mounting earth-engaging elements, the main frame being supported for vertical and rocking movement relative to the A frame by a three-point suspension consisting of a connection between each lower corner of the A frame and the forward portion of the main frame permitting either end of said forward portion to raise and drop independently of the other end, and a strut between the top of the A frame and the rear, central portion of the main frame.

7. An earth-engaging implement for attachment to a tractor having a pair of transversely spaced, power liftable, trailing hitch links and a centrally located top link; said implement having a generally vertically extending A frame adapted to have its lower extremities pivotally connected to the rear ends of the hitch links and its upper portion pivotally connected to the rear end of the top link, a generally horizontal frame behind the A frame and mounting earth-engaging elements, and linkage supporting the horizontal frame from the A frame, said linkage comprising a pair of relatively short, transversely spaced lower links pivotally connected for vertical movement with the lower portion of the A frame and the front portion of the horizontal frame, and a relatively long top strut pivotally connected with the upper portion of the A frame and the rear portion of the horizontal frame, all of said pivotal connections being capable of limited universal movement.

8. A disc harrow for attachment to a tractor having a pair of transversely spaced, power liftable, trailing hitch links and a centrally located top link; said harrow having a generally vertically extending A frame adapted to have its lower extremities pivotally connected to the rear ends of the hitch links and its upper portion pivotally connected to the rear end of the top link, a generally horizontal main frame behind the A frame, a plurality of disc-harrow gangs supported from the main frame, and linkage supporting the main frame from the A frame, said linkage comprising a pair of relatively short, transversely spaced, for-and-aft extending lower links pivotally connected for vertical movement between the lower portion of the A frame and the front portion of the horizontal frame and a relatively long top strut pivotally connected with the upper portion of the A frame and the rear portion of the horizontal frame, all of said pivotal connections being capable of limited universal movement.

9. A disc harrow for attachment to a tractor having a pair of transversely spaced, power liftable, trailing hitch links and a centrally located top link; said implement having a generally vertically extending A frame adapted to have its lower extremities pivotally connected to the rear ends of the hitch links and its upper portion pivotally connected to the rear end of the top link, a generally horizontal frame immediately behind the A frame, a plurality of disc-harrow gangs supported from the main frame, and linkage supporting the horizontal frame from the A frame, said linkage comprising a pair of relatively short, transversely spaced, fore-and-aft extending lower links pivotally connected for vertical swinging movement and limited universal movement between the lower corners of the A frame and with the horizontal frame a short distance to the rear of its forward edge and a relatively long top strut connecting the upper portion of the A frame and the rear central portion of the horizontal frame, the horizontal frame being relatively unaffected by rocking and pitching movement of the tractor and A frame.

10. An earth-engaging implement for attachment to a tractor having a pair of transversely spaced, power liftable, trailing hitch links and a centrally located top link; said implement having a generally vertically extending A frame adapted to have its lower extremities pivotally connected to the rear ends of the hitch links and its upper portion pivotally connected to the rear end of the top link, a generally horizontal frame immediately behind the A frame and mounting a plurality of earth-engaging implements, and linkage supporting the horizontal frame from the A frame, said linkage comprising a pair of relatively short, transversely spaced lower links pivotally connected for vertical swinging movement and limited universal movement with the lower corners of the A frame and with the underside of the horizontal frame a short distance to the rear of its forward edge and a relatively long top strut connecting the upper portion of the A frame and the rear central portion of the horizontal frame, the lower links being positioned beneath the front edge of the horizontal frame and engagement of said links therewith limiting downward movement of the front edge of said frame relative to the A frame.

11. An earth-engaging implement for attachment to a tractor having a pair of transversely spaced, power liftable, trailing hitch links; said implement having a generally vertically extending frame adapted to have its lower extremities pivotally connected to the rear ends of the hitch links, a generally horizontal frame behind the vertically extending frame and mounting earth engaging elements, a pair of relatively short, independently swingable, transversely spaced lower links pivotally connecting the forward portion of the horizontal frame with the lower extremities of the vertically extending frame for vertical and rocking movement of the main frame relative to the vertically extending frame, and a relatively long top strut connecting the upper portion of the vertically extending frame with the rear, central portion of the horizontal frame.

References Cited in the file of this patent

UNITED STATES PATENTS

| | | |
|---|---|---|
| 2,561,032 | Onfrey | July 17, 1951 |
| 2,577,002 | Corl et al. | Dec. 4, 1951 |
| 2,664,805 | Green et al. | Jan. 5, 1954 |
| 2,704,018 | Oehler et al. | Mar. 15, 1955 |

FOREIGN PATENTS

| | | |
|---|---|---|
| 556,859 | Great Britain | Oct. 26, 1943 |